E. J. B. COUPEL.
DOUGH RAISER.
APPLICATION FILED JAN. 17, 1914.
1,103,268. Patented July 14, 1914.
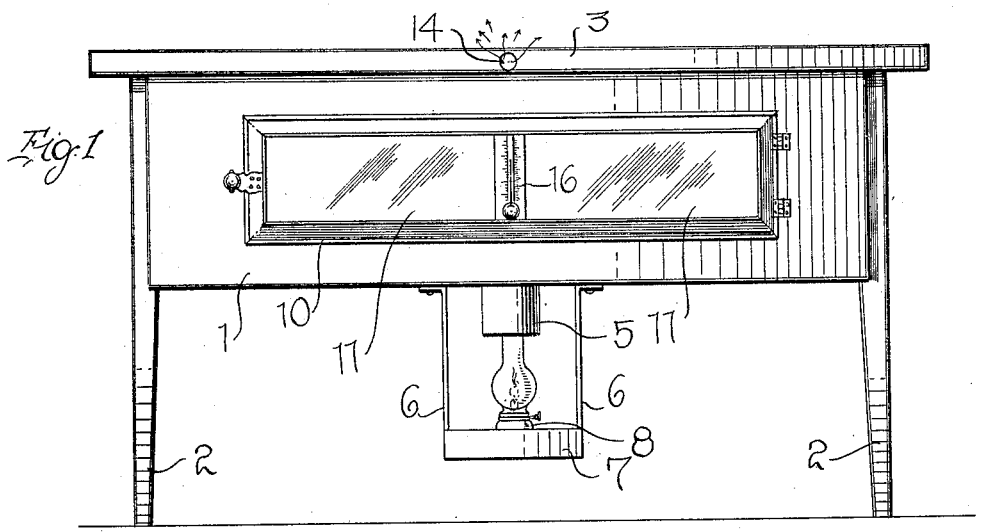
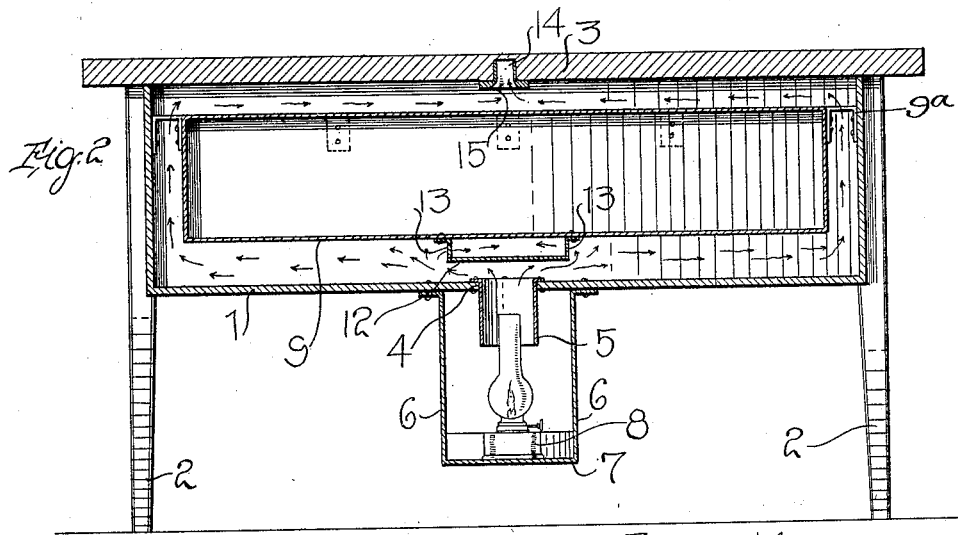
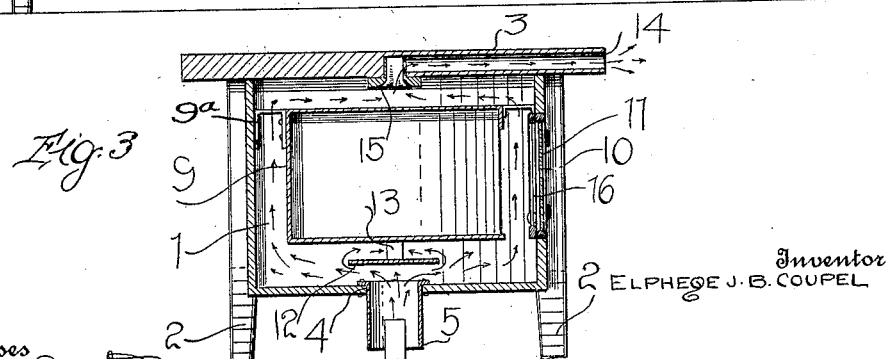
Inventor
ELPHEGE J. B. COUPEL
Witnesses
By Watson E. Coleman
Attorney
THE NORRIS PETERS CO., PHOTO-LITHO., WASHINGTON, D. C.

UNITED STATES PATENT OFFICE.

ELPHEGE J. B. COUPEL, OF MORGAN CITY, LOUISIANA.

DOUGH-RAISER.

1,103,268.  Specification of Letters Patent.  Patented July 14, 1914.

Application filed January 17, 1914. Serial No. 812,766.

*To all whom it may concern:*

Be it known that I, ELPHEGE J. B. COUPEL, a citizen of the United States, residing at Morgan City, in the parish of St. Mary and State of Louisiana, have invented certain new and useful Improvements in Dough-Raisers, of which the following is a specification, reference being had to the accompanying drawings.

This invention relates to new and useful improvements in dough raisers, and the primary object of the invention is to provide a simple and efficient device of this character which will effectively raise the dough in a pan in materially less time than is usually required to accomplish the desired result.

A further object of the invention resides in providing a dough raiser in which an oven is provided entirely spaced from the main frame of the device and carrying a hot air deflector whereby the heated air will be directed to all parts of the oven equally.

Still another object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claimed.

In the accompanying drawing forming a part of this application, Figure 1 is a front elevation of a device constructed in accordance with my invention. Fig. 2 is a vertical longitudinal section therethrough. Fig. 3 is a central vertical transverse section through the apparatus.

In describing my invention, I shall refer to the drawing in which similar reference characters designate corresponding parts throughout the several views and in which 1 indicates a housing mounted on the supporting legs 2 and having a top 3 thereon. The bottom of this housing is provided with an opening 4 arranged about centrally therein and held in said opening is a depending draft flue 5. Secured to the bottom of the housing by means of the brackets 6, is a lamp holder 7, which supports a lamp 8 of the usual or any preferred character, the chimney of which projects into the draft flue 5.

Securely mounted within the housing or casing 1, is an oven 9 which is formed preferably of metal and is held entirely spaced from the top, bottom and side walls of the casing or housing 1 by U-shaped brackets 9ª secured to the oven and to the inner walls of the casing. A hinged door 10 is provided in the front wall of the housing or casing 1, whereby entrance may be readily had to the oven 9 and the door 10 is covered with a transparent pane 11, whereby dough within the oven may be readily observed from the outside.

The bottom of the oven 9 is disposed over the draft flue 5, and in order to direct the heat which rises upwardly from the lamp 8 to various parts of the main casing, so as to entirely heat the oven 9 and also to prevent centering the greatest heat at one point of the oven bottom, a deflector or plate 12 is provided, the same being supported from the bottom of the oven 9, by means of the depending arms 13. This deflector receives directly thereagainst the heated air which rises from the lamp 8 and causes said air to be directed in both directions, as shown by the arrows in Fig. 2, around the oven 9. In this manner, the oven will be thoroughly heated in all parts.

A transverse flue 14 is provided in the top 3, and terminates at its outer end with the front edge of said top and forms an exhaust for the heated air. Communication is had between this flue and the interior of the housing 1, by means of a depending tubular connection 15 which is carried in the top and has its lower end flared outwardly within said housing 1. Thus, as the heated air passes around the oven 9, the same is conducted to the flue 14 through the medium of this flaring elbow 15 and, in this manner, a thorough circulation of the heated air through the device is had.

In order to determine the temperature of the heated air within the interior of the housing 1, a thermometer 16 of the usual or any preferred type is mounted in the transparent pane 11 of the door 10. In this manner the temperature of the device can be readily determined and, at the same time, the operator may observe the contents of the oven without opening the door 10.

From the foregoing description of the construction of my improved device, the operation thereof will be readily understood and it will be seen that I have provided an improved dough raiser which is simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

A dough raiser comprising a casing, an oven arranged therein and spaced therefrom on all sides, a deflector supported from the central portion of the bottom of the oven, a draft flue depending from the bottom of the casing, a lamp supported from the casing and having its chimney disposed within the flue, a draft flue formed in the top of the casing, and an elbow communicating from the interior of the casing with the flue.

In testimony whereof I hereunto affix my signature in the presence of two witnesses.

ELPHEGE J. B. COUPEL.

Witnesses:
MAURICE D. SHANNON,
HOMER L. JOLLEY.

---

Copies of this patent may be obtained for five cents each, by addressing the "Commissioner of Patents, Washington, D. C."